United States Patent

Yezrielev et al.

[11] Patent Number: 5,780,556
[45] Date of Patent: Jul. 14, 1998

[54] THERMOSET COATING COMPOSITIONS HAVING IMPROVED HARDNESS AND CURING PROPERTIES

[75] Inventors: Albert Ilya Yezrielev, Houston, Tex.; Konstantinos R. Rigopoulos, Baton Rouge, La.; Vijay Swarup, Houston, Tex.

[73] Assignee: Exxon Chemical Patents Inc., Houston, Tex.

[21] Appl. No.: 480,076

[22] Filed: Jun. 7, 1995

[51] Int. Cl.$^6$ .......................... C08F 20/00; C08G 63/68
[52] U.S. Cl. .......................... 525/437; 528/176; 528/179; 528/188; 528/189; 528/194; 528/206; 528/272; 528/274; 528/295.3; 528/296; 528/301; 528/302; 528/307; 528/308; 528/308.6; 525/437; 525/438; 525/439; 525/444; 525/448
[58] Field of Search .......................... 528/176, 179, 528/188, 189, 194, 206, 272, 274, 295.3, 296, 301, 302, 307, 308, 308.6; 525/437, 438, 439, 444, 445, 448

[56] References Cited

U.S. PATENT DOCUMENTS

| | | | |
|---|---|---|---|
| 4,331,782 | 5/1982 | Linden | 525/173 |
| 4,888,441 | 12/1989 | Calbo et al. | 560/198 |
| 4,922,002 | 5/1990 | Calbo et al. | 560/193 |
| 5,166,289 | 11/1992 | Yezrielev et al. | 525/443 |
| 5,239,018 | 8/1993 | Yezrielev et al. | 525/418 |

*Primary Examiner*—Samuel A. Acquah
*Attorney, Agent, or Firm*—John F. Hunt

[57] ABSTRACT

The present invention provides an amino curable polyester oligomer composition having low viscosity and a narrow molecular weight distribution comprising one or a mixture of oligomers (a) and (b):

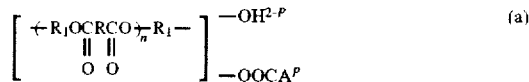

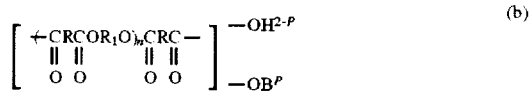

wherein R is the residue of at least one aliphatic, cycloaliphatic or mixed aliphatic/aromatic polycarboxylic-acid having from 2 to about 20 carbon atoms. $R_1$ is the residue of at least one aliphatic, cycloaliphatic or mixed aliphatic/cycloaliphatic polyol having from 2 to about 20 carbon atoms. A is a radical of the formula:

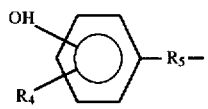

B is a radical of the formula:

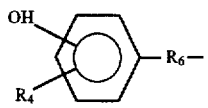

wherein $R_4$ is H, OH, halogen or an organic radical containing 1 to 4 carbon atoms, $R_5$ is a direct bond or an organic radical containing 1 to 20 carbon atoms and $R_6$ is an organic radical containing 2 to 20 carbon atoms. n is a number averaging from greater than 0 up to less than 2 and p is a number averaging from about 0.5 up to less than 2, said composition further characterized by a number average molecular weight in the range of from about 250 to about 1,000 and a polydispersity of less than about 2.0.

The invention also provides for curable blends of these polyester oligomers with other polymers such as polyesters, alkyds, acrylic polymers and the like, which may be further used to prepare curable coating and paint formulations, and also may contain other ingredients such as a crosslinking catalyst, fillers, pigments and the like. When cured, the coatings of this invention exhibit improved physical and chemical properties when compared with cured coatings which do not contain the polyester oligomer component.

14 Claims, 1 Drawing Sheet

THERMOSET COATING COMPOSITIONS HAVING IMPROVED HARDNESS AND CURING PROPERTIES

BACKGROUND OF THE INVENTION

1. Field of the Invention

The present invention relates to crosslinkable polymer compositions, to solid crosslinked polymer compositions prepared therefrom, and to methods for improving coating properties of films and surface coatings based thereon.

2. Description of Related Art

Thermosettable coating formulations, particularly alkyd, acrylic, polyester or diester-based coating compositions, are often the materials of choice for application to various substrates, particularly metal substrates, as a paint or a protective coating. Such coatings can be formulated to provide a good balance of properties such as hardness, flexibility, solvent resistance, corrosion resistance, weatherability and gloss. The enhancement of these properties depends on many factors including type, molecular weight, monomer composition, and glass transition temperature (Tg) of the resin; type and amount of the crosslinker; curing conditions; curing catalysts; pigments; fillers and additives. Variations of these parameters can be used to create a wide range of differences in film properties to fit requirements for a number of diverse applications. However, it is not always possible to optimize all of the desirable properties simultaneously.

The hardness of thermoset coating compositions can usually be increased by either providing a resin monomer composition having high glass transition temperature or by increasing the crosslink density.

The achievement of increased hardness by increasing polymer Tg gives rise to polymers having increased viscosity which in turn may require the use of larger than desirable quantities of solvent to form solutions suitable for coating processes.

On the other hand, an increase in crosslink density of di- or polyhydroxy-containing polymers containing a multifunctional crosslinking agent such as a multi-alkoxy methyl amino crosslinking agent may be achieved by increasing the concentration of the hydroxy functional groups present in the polymer. For example, polyester polymers made by condensing a dibasic acid and an excess of diol and containing terminal hydroxyl groups and having a low molecular weight contain a greater number of terminal hydroxy groups available as crosslinking sites than do the higher molecular weight materials. Thus, an increase in hardness of such resins can be achieved simultaneously with a reduction in viscosity and a reduction of the volatile solvent content of coating and paint formulations.

However, a very high degree of crosslinking tends to seriously reduce the flexibility and may also affect other properties of the cured coating. Also, the use of high levels of crosslinking agents needed for a high degree of crosslinking results in the formation of a large amount of volatile by-products of the crosslinking reaction which is undesirable in such coating formulations.

One technique for improving the hardness and other properties of such coatings is the inclusion in the curable composition of from about 1 to 60 wt % of a bis phenolic compound, e.g., bisphenol-A, as disclosed in U.S. Pat. No. 5,166,289. The polyhydric phenol component participates in the crosslinking reaction involving the base resin and the amino crosslinking agent, thereby providing cured coating of increased hardness.

However, the bisphenols tend to be poorly soluble in solvents normally used in such compositions, and additional solvent quantities may be needed to provide the requisite solubility. The inclusion of large amounts of solvent to provide more workable viscosities also increases the content of volatiles present in the composition, which is undesirable.

It is also disclosed in the above referenced patent that the bis-phenol linking group may be a divalent organic radical having a molecular weight of less than about 400. An example of such bisphenolic compound is the ester condensation product of about 2 moles of para-hydroxybenzoic acid (PHBA) and about 1 mole of neopentyl glycol, such as prepared in Example 5 of the reference.

U.S. Pat. No. 5,239,018 discloses oligomers and polymers having terminal functionality e.g., aliphatic or cycloaliphatic hydroxy, which will undergo an ester-type reaction with carboxylic functionality of materials such as PHBA to form phenol capped polymers. Blends of phenol-capped polymers with other curable resins are also disclosed, but the phenol capped polymers used in blends all have diol/acid mole ratios of at least 3:2 and contain 2 moles of PHBA. Also, in many cases these polyesters require a significant amount of solvent to achieve a desirable viscosity for paint formulations.

It is also known from U.S. Pat. Nos. 4,888,441 and 4,922,002 that aliphatic hydroxy terminated polyesters with a low molecular weight (e.g., 600 or less) and a narrow molecular weight distribution can be prepared by esterification of a significant excess of aliphatic diol (polyol) with a polycarboxylic acid followed by separation (stripping) of excess diol from the product by a vacuum distillation process. However, removal of excess diol using vacuum distillation tends to lead to an increase in the molecular weight distribution of the resulting product as the result of transesterification of the polymer (oligomer) during distillation.

SUMMARY OF THE INVENTION

The present invention provides for crosslinkable polyester oligomer composition and coating compositions based on a blend of a curable polymer and one or more of polyfunctional polyester oligomers. The polyester oligomer composition comprises one or a mixture of oligomers (a) and (b):

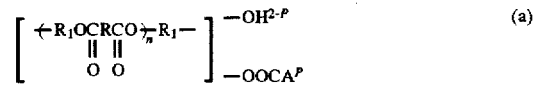

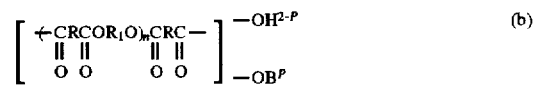

wherein R is the residue of at least one aliphatic cycloaliphatic or mixed aliphatic/aromatic polycarboxylic acid having from 2 to about 20 carbon atoms, $R_1$ is the residue of at least one aliphatic, cycloaliphatic or mixed aliphatic/cycloaliphatic polyol having from 2 to about 20 carbon atoms, A is a radical of the formula:

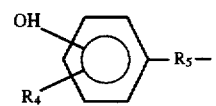

B is a radical of the formula:

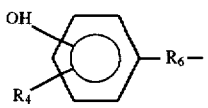

wherein $R_4$ is H, OH, halogen or an organic radical containing 1 to 4 carbon atoms, $R_5$ is a direct bond or an organic radical containing 1 to 20 carbon atoms and $R_6$ is an organic radical containing 2 to 20 carbon atoms, n is a number averaging from greater than 0 up to less than 2 and p is a number ranging from about 0.5 up to less than 2, said composition further characterized by a number average molecular weight in the range of from about 250 to about 1,000 and a polydispersity of less than about 2.0.

The crosslinkable composition of this invention may be used alone or may be blended with other polymers to prepare curable coating and paint formulations having workable (sprayable) viscosities and reduced VOC content. The compositions may also contain other ingredients such as a crosslinking catalyst, fillers, pigments and the like. When cured, the coatings of this invention generally exhibit improved hardness and impact properties when compared with cured polymer-based coatings which do not contain the polyester oligomer additive. These cured coatings also have good weatherability, good corrosion resistance and hydrolytic stability, enhanced oxidative and radiation stability, good solvent and sag resistance and good adhesion properties.

DETAILED DESCRIPTION OF THE INVENTION

Figure 1:
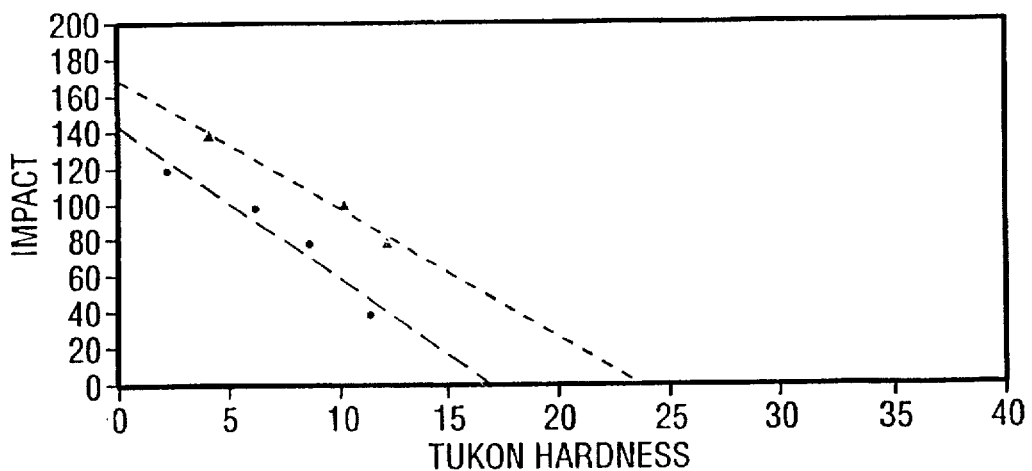
FIGS. 1, 2 and 3 are each graphs plotting hardness properties and impact properties of various cured compositions prepared in accordance with Examples 19 to 37.

The present invention provides for curable compositions containing polyester oligomers which contain at least two functional groups per molecule which are reactive with curing agents such as those containing methylol and/or alkoxy methyl groups. These reactive functional groups are provided by polyfunctional phenol compounds which contain a carboxylic acid group or an aliphatic or cycloaliphatic hydroxyl group which are reactive respectively with polyols or polycarboxylic acids in conventional esterification reactions. The polyester oligomers having a low number average molecular weight of up to about 1,000, low viscosity and a very narrow molecular weight distribution, (polydispersity or Mw/Mn) of less than 2.0 can be prepared by careful control of the monomer mole ratio of the polyol and polycarboxylic acid used to form the polyester and by inclusion of the above described polyfunctional phenolic compounds in the polymerization recipe. These products are also characterized as containing an extremely low content of volatile organic compounds (VOC) as produced, which reduces or eliminates the need to further vacuum strip the products to remove unwanted volatiles such as unreacted polyols.

Oligomers having the general structure of formula (a) above where n is >0 and <2 may be prepared by the following general synthesis:

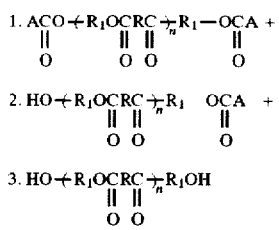

The oligomer esterification product is actually a mixture of oligomers corresponding to 1, 2 and 3 above. The proportion of each oligomer of type 1, 2 or 3 present in the mixture will vary primarily as a function of the number of moles of ACOOH phenol carboxylic acid used in the reaction. Where about two moles of ACOOH compound is used, the reaction product will generally contain greater than about 96 mol % of bis phenol capped oligomer (1), up to about 4 mol % of oligomer (2) and less than about 0.05 mol % of unreacted oligomer (3). Where only about 1 mole of ACOOH compound is used, the primary oligomer present in the reaction product will be oligomer (2), about 40–60 wt %, with the balance being a mixture of about 20–30 wt % of each of oligomers (1) and (3). Thus, the average value of P in the oligomer composition will generally range from about 0.5 up to 2.0 as a function of the molar concentration of ACOOH compound used in the reaction.

Oligomers having the general structure of formula (b) above would be prepared by similar reaction schemes using a BOH compound instead of an ACOOH compound to yield the following mixtures of products 4, 5 and 6:

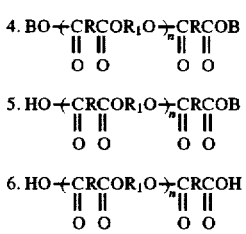

All of these oligomers and mixtures of oligomers are capable of undergoing cross linking reactions with amino crosslinking agents containing methylol and/or alkoxy methyl groups since both the aliphatic or cycloaliphatic hydroxyl groups and phenol groups are reactive with such agents to form thermoset compositions.

In the more preferred embodiment, oligomers of the general formulas (a) and (b) above are prepared using greater than 1 up to about 2 moles of ACOOH or BOH compound. At these molar ratios, the average value for P in formulas (a) and (b) will range from about 0.5 to about 2.0, more preferably from about 0.8 to about 1.9 and most preferably from about 1 to about 1.8 or 1.7.

Typical ACOOH phenolic compounds which may be used in the present invention include phenol carboxylic acids wherein A represents a radical of the structure:

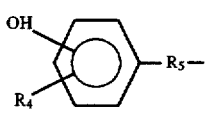

wherein $R_5$ is a direct bond or an organic radical containing 1 to about 20 carbon atoms and $R_4$ is H, OH, halogen or an organic radical containing 1 to 4 carbon atoms. $R_5$ may include heteroatoms in the structure and may also incorporate another phenol or an aliphatic hydroxyl, ester, ether or amide group in the structure.

Typical examples of such phenol carboxylic acids include compounds where $R_5$ is a direct bond, i.e., hydroxybenzoic acids such as ortho-, para-, or meta-hydroxybenzoic acids. In a preferred embodiment, the hydroxybenzoic acid is para-hydroxybenzoic acid (PHBA).

Other useful phenol carboxylic acids include hydroxyphenylacetic acid ($R_5$ is methylene), hydroxy phenylpropionic acid ($R_5$ is ethylene), 10-hydroxyphenyl stearic acid, hydroxycarboxy benzophenone and 4,4-bis hydroxyphenyl pentanoic acid.

Typical phenol alcohols of the BOH type which may be used in the present invention include phenols having radicals containing at least one aliphatic or cycloaliphatic hydroxy group wherein B represents a radical or the structure:

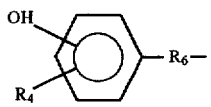

wherein $R_6$ is an organic radical containing from 2 to about 20 carbon atoms and $R_4$ is as stated above. $R_6$ may also include heteroatoms in the structure and may also incorporate another phenol or another aliphatic hydroxyl group, as well as an ester, ether or amide group in the structure.

Typical examples of such phenol alcohols include beta-hydroxyethyl phenol ($R_6$ is —$CH_2$—$CH_2$—), beta-hydroxyethyl ether of hydroquinone ($R_6$ is —$OCH_2$$CH_2$—), beta-hydroxyethyl ether of bisphenol A, gamma hydroxypropyl phenol ($R_6$ is —$CH_2$—$CH_2$—$CH_2$—), hydroxyphenyl stearyl alcohol and like materials.

Polyester oligomers of the general structure of formula (a) above are prepared by the esterification reaction of the ACOOH compound with a mixture of n moles of HOOC—R—COOH polycarboxylic acid and n+1 moles of HO—$R_1$—OH polyol. Polyester oligomers of the general structure of formula (b) above are prepared by the esterification reaction of the BOH compound with a mixture of n moles of HO—$R_1$—OH polyol and n+1 moles of HOOC—R—COOH polycarboxylic acid. In each case, n is a number averaging from greater than 0 to less than 2. In formulas (a) and (b), n preferably averages from about 0.5 to about 1.5, more preferably from about 0.5 to about 1.3, and most preferably from 0.8 to 1.2.

Suitable polyols which may be used to prepare the polyester oligomers include aliphatic or cycloaliphatic diols or triols containing from about 2 to 20 carbon atoms, more preferably from about 2 to 10 carbon atoms, as well as mixtures of different polyols.

Some preferred examples of the polyols are one or more of the following diols: neopentyl glycol; ethylene glycol; propylene glycol; hexamethylenediol; 1,2-cyclohexanedimethanol; 1,3-cyclohexanedimethanol; 1,4-cyclohexanedimethanol; diethylene glycol; trimethylene glycol; tetraethylene glycol; dipropylene glycol; polypropylene glycol; hexylene glycol; 2-methyl-1,3-propanediol; 2-methyl-2-ethyl-1,3-propanediol; 2-ethyl-1,3-hexandediol; 1,5-pentanediol; thiodiglycol; 1,3-propanediol; 1,2-propanediol; 1,2-butanediol; 1,3-butanediol; 2,3-butanediol; 1,4-butanediol; 2,2,4-trimethyl-1,3-pentanediol; 1,2-cyclohexanediol; 1,3-cyclohexanediol; 1,4-cyclohexanediol; neopentyl diol hydroxy methyl isobutyrate, and mixtures thereof. Examples, of polyols include triols such as glycerine, trimethylol ethane, trimethylol propane, pentaerythritol and the like.

Where triols and higher polyols are used, ACOO-ester linkages may be formed along the polymer chain in addition to the end cap groups shown in formula (a) above.

The polycarboxylic acid component used to prepare the polyester oligomers include dicarboxylic acids which may be aliphatic and cycloaliphatic, as well as mixtures thereof., or a mixture of aliphatic or cycloaliphatic and aromatic dicarboxylic acids having from 2 to about 20 carbon atoms., more preferably from about 2 to 10 carbon atoms. The carboxyl groups may be present in the form of anhydride groups, lactone groups, or equivalent ester forming derivatives such as the acid halide or methyl ester. Suitable aliphatic acids include adipic acid, succinic acid, glutaric acid, fumaric acid, maleic acid, cyclohexane dicarboxylic acid, azeleic acid, sebacic acid, dimer acid, caprolactone, propiolactone, pyromellitic dianhydride, substituted maleic and fumaric acids such as citraconic, chloromaleic, mesaconic, and substituted succinic acids such as aconitic and itaconic, and mixtures thereof. Many commercially available polyesters are produced using a combination of aromatic and aliphatic dicarboxylic acids or a combination of cycloaliphatic and aliphatic dicarboxylic acids or combinations of all three types. Suitable aromatic acids are phthalic acid or anhydride, isophthalic acid, terephthalic acid and like materials. However, where polyesters having low viscosity and low solvent content are desired, the most preferred acids used for the purposes of this invention are linear saturated or unsaturated aliphatic dicarboxylic acids having from 2 to 10 carbon atoms such as succinic, glutaric, adipic, and similar materials.

Representative examples of difunctional polyester oligomers of the formula (a) above which may be prepared in accordance with this invention are the esterification product of 1–2 moles of PHBA, 1 mole of adipic acid and up to about 2 moles of neopentyl glycol, and the esterification product of 1–2 moles of PHBA, 1 mole of a mixture of at least 50 mole % adipic acid and up to 50 mole % of phthalic acid or anhydride or isophthalic acid or mixtures of these acids, and up to about 2 moles of neopentyl glycol.

The esterification reaction to produce the difunctional polyester oligomers may be conducted in a single or two stage reaction sequence. In the single stage reaction, all of the reactants, solvent and optional catalyst are combined and gradually heated at a temperature of about 140°–200° C. It is desirable to maintain the temperature at this level until at least about 70% of the esterification reaction has taken place. The water of reaction is used to monitor the progress of the reaction. The reaction temperature may then be raised up to about 230° C. to complete the reaction.

In a two stage reaction, the ACOOH or BOH compound may be first reacted with a molar excess of the diol or dibasic acid respectively by heating at a temperature of about 140°–200° C. After most of the water of reaction has been removed, the other monomer, e.g., the polybasic acid or acid derivative or the diol respectively, is added and the second stage of the reaction is carried out also at temperatures of 140°–200° C. The reaction may be completed as above by heating up to about 230° C.–240° C.

In another variation of the two stage reaction, the aliphatic hydroxy-functional or carboxy-functional polyester can be first prepared conventionally in the absence of the ACOOH or BOH compound. The resulting polyester oligomer is then added to the ACOOH or BOH compound and esterification can be conducted under conditions as described above.

The reaction may be conducted in the presence or absence of a conventional esterification catalyst. The addition of proper catalysts can be beneficial in accelerating the reaction. Suitable catalysts for the reaction include numerous oxides, salts, and alcoholates of Group II to V metals, like Zn, Sn, Al, Mn, and Ti which are known as esterification and trans-esterification catalysts. Other catalysts include such metalloid compounds as $B_2O_3$, $H_3BO_3$, $Sb_2O_3$, $As_2O_3$, etc. The catalyst employed can also be a weak acid such as phosphorous acid, phosphoric acid, or hypophosphorous acid, or a strong acid catalyst such as p-toluene sulfonic acid and methane sulfonic acid. These catalysts can be used in Quantities ranging from about 0.01 wt. % to about 2.0 wt %. Where PHBA is used as the phenol carboxylic acid, it is preferred to use less basic catalysts and to avoid the presence of basic impurities in the catalyst, since such impurities can catalyze PHBA decarboxylation.

In some cases, no solvent is required during the synthesis. In other cases, one or more solvents can be used to dissolve the reactants. If a solvent is used, it should be inert during the esterification reaction. Hydrocarbon solvents are preferable and aromatic hydrocarbon solvents are most preferable.

These synthesis processes are more particularly described in U.S. Pat. No. 5,239,018, the complete disclosure of which is incorporated herein by reference.

The difunctional polyester oligomers of the invention may be characterized by a number average molecular weight (Mn) of from about 250 to 1,000, more preferably from about 250 to 800 and most preferably from about 250 to 600. The molecular weight distribution of these materials or polydispersity (weight average molecular weight Mw divided by number average molecular weight Mn) is generally less than about 2.0, more preferably less than about 1.7 and most preferably less than about 1.5. Typical polydispersity values may range from about 1.3 to about 1.5. These polymers are also characterized by very low viscosities when mixed with liquids such as amino crosslinking agents discussed below, or diluted with very small amounts of solvents. Surprisingly, these very low polydispersities are achieved without any special techniques required for purification from excess of one or more of the monomers and achieved by the very simple synthesis procedure described above.

As indicated above, the difunctional oligomers of the invention are characterized by low molecular weight, narrow molecular weight distribution and also by a low viscosity. Since they may be prepared without the need to use significant excess diol or excess dicarboxylic acid to drive the esterification reaction, as produced they contain minimal quantities of unreacted reactants which means they contain a very low VOC content. These properties, combined with the fact that these materials are crosslinkable or at least participate in crosslinking reactions at baking conditions, render these materials especially suitable as a reactive low viscosity component when combined with other crosslinkable polymer systems used in paint and coating formulations. Their use in organic solvent based, curable coating formulations reduces, and in some cases may eliminate, the need to use additional organic solvents in such coating formulations in order to achieve coating composition viscosities which render these compositions flowable and/or sprayable. As a result, highly crosslinked polymer structures can be built at baking conditions with the use of very low molecular weight raw materials and low solvent quantities.

The curable polymer component with which the difunctional oligomers may be blended may comprise a di- or polyhydroxy functional polymer including a diester, a polyester, an alkyd polymer, an acrylic polymer, a polyether, a polycarbonate polymer, a hydroxy functional epoxy or mixtures of two or more of these materials.

Suitable diesters and polyesters are materials having the general formula I:

I.

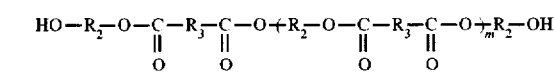

wherein m is 0 or an integer ranging from 1 to about 40, $R_2$ is a divalent aliphatic or cycloaliphatic radical containing from 2 to about 40 carbon atoms or a mixture of such radicals, and $R_3$ is a divalent aliphatic, cycloaliphatic or aromatic radical containing from 2 to about 40 carbon atoms, or a mixture of such radicals. Obviously, when m is 0 in formula I, a simple diester is represented. When m ranges from 1 to about 40, a polyester is represented.

In the more preferred embodiments of the invention, $R_2$ is the divalent residuum of a di(poly)ol containing from 2 to about 20 carbon atoms, more preferably from about 2 to 10 carbon atoms, and may also contain internal ester groups.

Some preferred examples of the diols are one or more of the following: neopentyl glycol; ethylene glycol; propylene, glycol; hexa-methylenediol; 1,2-cyclohexanedimethanol; 1,3-cyclohexanedimethanol; 1,4-cyclohexanedimethanol; diethylene glycol; trimethylene glycol; tetraethylene glycol; dipropylene glycol; polypropylene glycol; hexylene glycol; 2-methyl-2-ethyl-1,3-propanediol; 2-ethyl-1,3-hexandediol; 1,5-pentanediol; thiodiglycol; 1,3-propanediol; 1,2-propanediol; 1,2-butanediol; 1,3-butanediol; 2,3-butanediol; 1,4-butanediol; 2,2,4-trimethyl-1,3-pentanediol; 1,2-cyclohexanediol; 1,3-cyclohexanediol; 1,4-cyclohexanediol; neopentyl diol hydroxy methyl isobutyrate, and mixtures thereof. Examples of polyols include triols such as glycerine, trimethylol ethane, trimethylol propane, pentaerythritol and the like.

$R_3$ in formula I above is the divalent residuum of a dicarboxylic acid having from 2 to abut 40 aliphatic carbon atoms, from about 5 to 40 cycloaliphatic carbon atoms or from 6 to about 40 aromatic carbon atoms, as well as mixtures of these acids. The carboxyl groups may be present in the form of anhydride groups, lactone groups, or equivalent ester forming derivatives such as the acid halide or methyl ester. The dicarboxylic acids or derivatives are preferably one or more of the following: adipic acid, succinic acid, glutaric acid, fumaric acid, maleic acid, cyclohexane dicarboxylic acid, azeleic acid, sebasic acid, dimer acid, caprolactone, propiolactone, pyromellitic dianhydride, substituted maleic and fumaric acids such as citraconic, chloromaleic, mesaconic, and substituted succinic acids such as aconitic and itaconic, and mixtures thereof. Aromatic acids which may be used include phthalic anhydride, terephthalic acid, isophthalic acid and naphthalene dicarboxylic acid. Many commercially available polyesters are produced using a combination of aromatic and aliphatic dicarboxylic acids or a combination of cycloaliphatic and aliphatic dicarboxylic acids or combinations of all three types.

The acrylic polymers which may be used as a polymeric component in the present invention are acrylic copolymer resins. The acrylic copolymer resin is prepared from at least one hydroxy-substituted alkyl (meth) acrylate and at least one non-hydroxy-substituted alkyl (meth) acrylate. The hydroxy-substituted alkyl (meth) acrylates which can be employed as monomers comprise members selected from the group consisting of the following esters of acrylic or methacrylic acid and aliphatic glycols: 2-hydroxyethyl acrylate, 3-chloro-2-hydroxypropyl acrylate; 1-hydroxy-2- acryloxy propane; 2-hydroxypropyl acrylate; 3-hydroxypropylacrylate; 2,3-dihydroxypropylacrylate; 3-hydroxybutyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 1-hydroxy-2-methacryloxy propane; 2-hydroxypropyl methacrylate; 2,3-dihydroxypropyl methacrylate; 2-hydroxybutyl methacrylate; 3-hydroxybutyl methacrylate; 2-hydroxyethyl methacrylate; 4-hydroxybutylmethacrylate; 3,4-dihydroxybutyl methacrylate; 5-hydroxypentyl methacrylate; and 7-hydroxyheptyl methacrylate. The preferred hydroxy functional monomers for use in preparing the acrylic resins are hydroxy-substituted alkyl (meth) acrylates having a total of 5 to 7 carbon atoms, i.e., esters of $C_2$ to $C_3$ dihydric alcohols and acrylic or methacrylic acids. Illustrative of particularly suitable hydroxy-substituted alkyl (meth) acrylate monomers are 2-hydroxyethyl methacrylate, 2-hydroxyethyl acrylate, 2-hydroxybutyl acrylate, 2-hydroxypropyl methacrylate, and 2-hydroxypropyl acrylate.

Among the non-hydroxy-substituted alkyl (meth)acrylate monomers which may be employed are alkyl (meth) acrylates. Preferred nonhydroxy unsaturated monomers are esters of $C_1$ to $C_{12}$ monohydric alcohols and acrylic or methacrylic acids, e.g., methyl methacrylate, hexyl acrylate, 2-ethylhexyl acrylate, lauryl methacrylate, glycidyl methacrylate, etc. Examples of particularly suitable monomers are butyl acrylate, butyl methacrylate and methyl methacrylate.

Additionally, the acrylic copolymer resins used in the present invention may include in their composition other monomers such as acrylic acid and methacrylic acid, monovinyl aromatic hydrocarbons containing from 8 to 12 carbon atoms (including styrene, alpha-methyl styrene, vinyl toluene, t-butyl styrene, chlorostyrene and the like), vinyl chloride, vinylidene chloride, acrylonitrile, epoxy-modified acrylics and methacrylonitrile.

The acrylic copolymer preferably has a number average molecular weight not greater than 20,000, more preferably between about 500 and 6000, and most preferably between about 1000 and 5000.

Alkyd polymers which may be used as the polymeric component of the composition of this invention have a formula similar to formula I above except that $R_2$ is a divalent residuum of a triol with one hydroxyl group esterified with a fatty acid. Typical triols are glycerine, trimethylol ethane and like materials. These alkyd resins are oil modified polyester resins and are broadly the product of the reaction of a dihydric alcohol and a dicarboxylic acid or acid derivative and an oil, fat or carboxylic acid derived from such oil or fat which acts as a modifier. Such modifiers are typically drying oils. The polyhydric alcohol employed is suitably an aliphatic alcohol, and mixtures of the alcohols may also be employed. The dicarboxylic acid, or corresponding anhydrides, may be selected from a variety of aliphatic carboxylic acids or mixtures of aliphatic and aromatic dicarboxylic acids.

Suitable acids and acid anhydrides include, by way of example, succinic acid, adipic acid, phthalic anhydride, isophthalic acid, trimellitic acid (anhydride) and bis 3,3', 4,4'-benzophenone tetracarboxylic anhydride. Mixtures of these acids and anhydrides may be employed to produce a balance of properties. As the drying oil or fatty acid there is suitably employed a saturated or unsaturated fatty acid of 12 to 22 carbon atoms or a corresponding triglyceride, that is, a corresponding fat or oil, such as those contained in animal or vegetable fats or oils. Suitable fats and oils include tall oil, castor oil, coconut oil, lard, linseed oil, palm oil, peanut oil, rapeseed oil, soybean oil and beef tallow. Such fats and oils comprise mixed triglycerides of such fatty acids as caprylic, capric, lauric, myristic, palmitic, and stearic and such unsaturated fatty acids as oleic, erucic, ricinoleic, linoleic and linolenic. Chemically, these fats and oils are usually mixtures of two or more members of the class. Alkyd resins made with saturated monocarboxylic acids and fats are preferable where improved weather resistance is of prime concern.

Polycarbonate oligomers or polymers which may be used in preparing the compositions of this invention are hydroxy terminated polycarbonates having the general formula II:

II.

wherein q is an integer ranging from 1 to about 40, m is an integer ranging from 0 to 40, and $R_2$ and $R_3$ are as defined above. This formula includes carbonates wherein m is 0 and q is 1 or greater which may be prepared by forming the condensation product of an aliphatic or cycloaliphatic diol having 2 to about 40 carbon atoms with a carbonic acid bis-aryl ester, such as diphenyl carbonate, followed by subsequent polycondensation reaction of this intermediate with said diol.

Also included in formula II are polyester diols lengthened via carbonate linkages and containing terminal carbonate groups linking the lengthened polyester diol backbone to terminal hydroxy-containing end groups, in which case m in formula II is equal to or greater than 1 and q is greater than 1.

A third category of polycarbonate within the scope of formula II are polyester diols containing terminal carbonate groups linking the polyester diol backbone to hydroxy-containing end groups, in which case q in formula II is equal to 1 and m is greater than 1. These materials may be prepared by forming the condensation product of a polyester diol with a carbonic acid bis-aryl ester, such as diphenyl carbonate, to form the polyester-diol bis-carbonic acid ester, followed by polycondensation of this precursor with a diol to form hydroxy terminated diesters.

The polymeric component may also comprise poly(oligo) mers which contain a combination of two or more of ester, ether, carbonate, acrylic and alkyd moieties in their structure. Examples of such materials are poly(ether)esters, poly(ether) carbonates and poly(ether) or poly(ester) acrylics.

The diesters and polyesters may be prepared by well known condensation processes using a molar excess of diol. Preferably the molar ratio of diol to dicarboxylic acid is r+1:r wherein r represents the number of moles of dicarboxylic acid. The reaction may be conducted in the absence of or presence of an aromatic or aliphatic solvent and in the absence of or presence of a suitable polycondensation catalyst as is known in the art.

The preferred number average molecular weight (Mn) of the polymers may generally range from about 300 up to about 20,000, more preferably from about 500 up to about 10,000, and most preferably from about 500 up to about 3,000 to 6,000. Glass transition temperatures (Tg) of these materials may generally range from as low as −40° C. up to +100° C. or higher.

The difunctional polyester oligomer (a) and/or (b) may be blended with one or more of the above base polymers at a blend ratio of from 1 to about 60% by weight of the polyester oligomer, based on the weight of the base polymer and crosslinking agent taken together. More preferred compositions contain the difunctional polyester oligomer at a level of from about 2 to 40% by weight, and most preferably at a level of from about 3 to about 30% by weight based on the weight of the base polymer and crosslinking agent taken together.

The preferred methylol(alkoxymethyl) amino crosslinking agents used in the present invention are well known commercial products, and are generally made by the reaction of di(poly)amide(amine) compounds with formaldehyde and, optionally, a lower alcohol.

Examples of suitable amino-crosslinking resins include one or a mixture of the following materials:

Melamine based resins

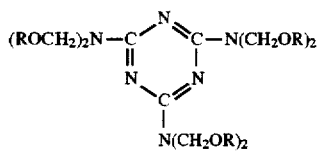

wherein R is the following:

R=CH$_3$ (Cymel® 300, 301, 303);

R=CH$_3$, C$_2$H$_5$ (Cymel® 1116);

R=CH$_3$, C$_4$H$_9$ (Cymel® 1130, 1133);

R=C$_4$H$_9$ (Cymel® 1156); or

R=CH$_3$ H (Cymel® 370, 373, 380, 385)

The preferred melamine is hexamethoxymethyl melamine.

Benzocruanamine based resins

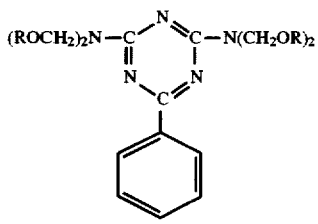

wherein

R=CH$_3$, C$_2$H$_5$(Cymel® 1123)

Urea based resins

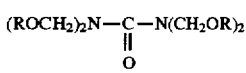

wherein

R=CH$_3$, H (Beetle™ 60, Beetle™ 65); or

R=C$_4$H$_9$ (Beetle™ 80).

Gycoluryl based resins

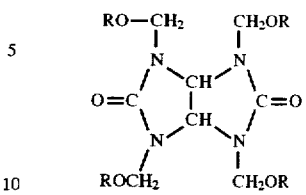

wherein:

R=CH$_3$, C$_2$H$_5$ (Cymel® 1171); or

R=C$_4$H$_9$ (Cymel® 1170).

In the present invention, the ratio of the active crosslinking groups, e.g., methylol (alkoxymethyl) groups of the amino crosslinking agent to the terminal hydroxy groups on the curable components is desirably from about 1.0:1.0 to 15.0:1.0, more preferably from about 1.5:1.0 to 5.0:1.0, most preferably from about 1.5:1.0 to 4.0:1.0.

On a weight basis, the amount of amino crosslinking agent effective for curing the crosslinkable binder generally ranges from about 3 to about 60 percent by weight, more preferably from about 10 to about 50 percent by weight based on the combined weight of the amino crosslinking agent, difunctional polyester oligomer and any other crosslinkable polymer constituent of the composition. In general, quantities of crosslinking agent required to cure the composition are inversely proportional to the number average molecular weight of polymer components. Quantities of crosslinking agent on the higher side of this range are required to properly cure polymer compositions having a relatively low number average molecular weight, e.g., from about 250 to about 3,000, whereas lesser amounts of the crosslinking agent are required to properly cure polymers having a higher number average molecular weight, e.g., from about 3,000 up to about 20,000.

The composition of the invention may also be cured using one or more multi-isocyanate crosslinking agents. Examples of such materials include aromatic and aliphatic di- or polyisocyantes of the type disclosed in U.S. Pat. No. 4,331,782, the complete disclosure of which is incorporated herein by reference.

In general, the crosslinking agent and the difunctional polyester oligomer product of formulas (a) and/or (b) above are present in the composition at a respective weight ratio of from about 30:70 to 70:30 respectively, exclusive of additional crosslinking agent used to cure the base polymer component.

The present invention also provides for coating compositions formed by combining the base polymer component, the difunctional polyester oligomer component, the crosslinking agent, and optionally a solvent. Application of the formulated coating can be made via conventional methods such as spraying, roller coating, dip coating, etc., and then the coating may be cured by baking.

Suitable optional solvents which may be included in the curable compositions of the invention comprise toluene, xylene, ethylbenzene, tetralin, naphthalene, and solvents which are narrow cut aromatic solvents comprising C$_8$ to C$_{13}$ aromatics such as those marketed by Exxon Chemical Company under the name Aromatic 100, Aromatic 150, and Aromatic 200.

Other suitable solvents include acetone, methyl ethyl ketone, methyl isobutyl ketone, methyl amyl ketone, methyl isoamyl ketone, methyl heptyl ketone, isophorone, isopropanol, n-butanol, sec.-butanol, isobutanol, amyl alcohol, isoamyl alcohol, hexanols, and heptanols.

Suitable oxygenated solvents include propylene glycol monomethyl ether acetate, propylene glycol propyl ether acetate, ethyl ethoxypropionate, dipropylene glycol monomethyl ether acetate, propylene glycol monomethyl ether, and like materials. Other such solvents include alkyl esters such as ethyl acetate, n-propyl acetate, butyl acetate, amyl acetate, mixtures of hexyl acetates such as sold by Exxon Chemical Company under the name EXXATE® 600 and mixtures of heptyl acetates sold under the name EXXATE® 700. The list should not be considered as limiting, but rather as examples of solvents which are useful in the present invention. The type and concentration of solvents are generally selected to obtain formulation viscosities and evaporation rates suitable for the application and baking of the coatings. Typical solvent concentrations in the formulations range from 0 to about 75% by weight with a preferred range between about 5 and 50% by weight and a most preferred range between about 10 and 40% by weight. For the preparation of high solids coatings, the amount of solvent used in the coating formulation is preferably less than 40% of the weight of the formulation.

Pigments are a further component which may be present in the curable compositions of this invention. They are generally included at a weight ratio in the range of from about 0.5 to about 5.0 to one pigment-to-binder ratio, the term binder referring to the total weight of polymer plus crosslinking agent.

Suitable pigments which may be included in the compositions of this invention are those opacifying pigments normally used in paint and coating formulations and include titanium dioxide, zirconium oxide, zircon, zinc oxide, iron oxides, antimony oxide, carbon black, as well as chrome yellows, greens, oranges, mixed metal oxides, ceramic pigments and the like. Preferred pigments include rutile $TiO_2$ and particularly weather resistant coated types of $TiO_2$. The pigments may also be blended with a suitable extender material which does not contribute significantly to hiding power. Suitable extenders include silica, barytes, calcium sulfate, magnesium silicate (talc), aluminum oxide, aluminum hydroxide, aluminum silicate, calcium silicate, calcium carbonate (mica), potassium aluminum silicate and other clays or clay-like materials.

Satisfactory baking schedules for formulations of the present invention vary widely including, but not limited to, low temperature bakes of about 20 to 30 minutes at temperatures between 90° and 105° C. for large equipment applications and high temperature bakes of about 5 to 60 seconds in 300° to 375° C. air for coil coating applications. In general, the substrate and coating should be baked at a sufficiently high temperature for a sufficiently long time so that essentially all solvents are evaporated from the film and chemical reactions between the polymer and the crosslinking agent proceed to the desired degree of completion. The desired degree of completion also varies widely and depends on the particular combination of cured film properties required for a given application.

Acid catalysts may be used to cure systems containing hexamethoxymethyl melamine and other amino crosslinking agents, and a variety of suitable acid catalysts are known to one skilled in the art for this purpose. These include, for example, p-toluene sulfonic acid, methane sulfonic acid, nonylbenzene sulfonic acid, dinonyl naphthalene monosulfonic acid, dinonylnapthalene disulfonic acid, dodecylbenzene sulfonic acid, phosphoric acid, phosphorous acid, phenyl acid phosphate, butyl phosphate, butyl maleate, and the like or a compatible mixture of them. These acid catalysts may be used in their neat, unblocked form or combined with suitable blocking agents such as amines. Typical examples of unblocked catalysts are the King Industries, Inc. products with the tradename K-CURE®. Examples of blocked catalysts are the King Industries, Inc. products with the tradename NACURE®.

The amount of catalyst employed typically varies inversely with the severity of the baking schedule. In particular, smaller concentrations of catalysts are usually required for higher baking temperatures or longer baking times. Typical catalyst concentrations for moderate baking conditions (15 to 30 minutes at 150° C.) would be about 0.2 to 0.7 wt % catalyst solids per polymer plus crosslinking agent solids. Higher concentrations of catalyst up to about 2 wt % may be employed for -cures at lower temperature or shorter times. Formulations containing sufficient residual esterification catalyst, such as phosphorous acid, may not require the inclusion of any additional crosslinking catalyst to effect a proper cure at lower curing temperatures.

In the case of formulations of this invention containing hexamethoxymethyl melamine as the crosslinking agent and p-toluene sulfonic acid as the catalyst, preferred curing conditions at dry film thickness of about 1 mil are catalyst concentration between about 0.05 and 0.6 wt %, based on polymer solids plus crosslinking agent solids, baking temperature between 130° and 210° C. and baking time between about 5 and 60 minutes. Most preferred curing conditions are catalyst concentration between about 0.05 and 0.5 wt %, baking temperature between about 140° and 180° C. and baking time between about 5 and 40 minutes.

As described above, the formulations of this invention are characterized by improved weather resistance. However, additional improvements in this and other properties can be achieved by including stabilizers and stabilizing systems into the formulation. Among compounds providing improvements in weather resistance are HALS (hindered amine light stabilizers), UV-screeners, and other antioxidants. Flow modifiers, rheology modifiers, pigment dispersants and the like may also be included in the composition.

Coating formulations of the present invention may be prepared by first forming a mill base. The mill base may be prepared by grinding a mixture of pigment, resin and solvent in a high speed disc disperser such as Byk-Gardner DISPERMAT® Model CV to form a pigment concentrate. This mill base is then let down (mixed) under mixing conditions with the remaining components of the formulation which include additional resin, solvent, crosslinking agent, and the catalyst.

The coating compositions of the invention may be applied to substrates by any suitable conventional technique such as spraying, roller coating, dip coating and the like. The composition may be applied in liquid form, and preferably is dispersed in an organic solvent.

The crosslink density and degree of crosslinking of the composition can be monitored by evaluating the impermeability of the cured coating to organic solvent. A suitable test for evaluating this property is MEK rub test as described in paragraph 5.2 of ASTM D3732. This test measures the number of double rubs of a swab soaked with methyl ethyl ketone (MEK) required to completely remove the cured coating from a substrate. Generally speaking, the coatings of this invention are crosslinked sufficiently such that MEK rub values of greater than about 5, more preferably of at least 15 and most preferably more than 5C or 100 are achieved.

Properly formulated binder paints and coatings comprising compounds of structure (a) and/or (b) above provide at least one of the improvements listed below:

improved hardness-flexibility balance lower VOC at a workable viscosity improved adhesion improved anti-corrosive properties improved solvent resistance improved oxidative and/or radiation resistance improved electric resistance improved weather resistance The following examples illustrate the preparation of some difunctional polyester oligomers and their use as a blend component in forming the curable polymer compositions of the invention. Materials identified in the examples are as follows:

| | |
|---|---|
| NPG | neopentyl glycol |
| MP-DIOL | 2-methyl-1,3-propane diol |
| PHBA | para-hydroxy benzoic acid |
| CARGILL ™57-5789 | A hydroxy functional polyester having a molecular weight of 900–1,000 available from McWhorter Corp. |
| CARGILL ™57-5742 | A short oil tofa-based alkyd resin also available from McWhorter Corp. |
| MIAK | Methyl isoamyl ketone |
| HMMM | Hexamethoxymethyl melamine crosslinking agent (Resimene 747). |
| BYK ™300 | Silicone flow control agent from Byk-Chemie. |
| BTHO | Monobutyl tin hydroxide oxide catalyst. |
| BYK ™ 451 | Amine blocked p-toluene sulfonic acid catalyst from Byk-Chemie. |

Examples 1–10 below illustrate the preparation of ten different ester reaction products of PHBA and various diols and dibasic acids, and the properties of each.

All synthesis examples were carried out using 1–5 liter four-necked round-bottom flasks equipped with a mechanical stirrer, heating mantle, nitrogen purger, a Dean-Stark Trap, chilled water condenser and thermometer fitted with temperature controller. Two columns, a first filled with Drierite and a second filled with Ascorite ($CO_2$ traps) were connected to a gas discharge line after the condenser to monitor PHBA decarboxylation. Amounts of components shown in the examples are in grams.

EXAMPLE 1

A 5 liter reactor was charged with:

| | |
|---|---|
| NPG | 991.0 |
| Adipic Acid | 694.5 |
| PHBA | 657.2 |
| Dibutyltin Oxide | 1.5 |
| Methane Sulfonic Acid deionized water) | 0.3(dilutedin25gr. |
| Toluene | 150.0 |

The contents were heated to 150° C., then to 200° C. 259 gr. water phase distilled off. The contents were cooled and an additional 657.2 gr. of PHBA was charged into the reactor. After purging with $N_2$, the contents were heated to 200° C. and 101.4 gr. of water phase was distilled off. The temperature was raised to 220° C. and an additional 74 gr. of water phase was distilled off. (The water phase also contained a small amount of NPG). The reaction product was cooled to 103° C. and 334.0 gr. of MIBK was charged into the reactor. After mixing, the product was discharged. The product had the following characteristics:

| | |
|---|---|
| NVM | = 85.5% |
| Carboxyl Acid No. (AN) | = 18.5 mg KOH/gr. of solid polymer |
| Phenol AN | = 192.3 mg KOH/gr. of solid polymer |
| Viscosity | = 15,000 cps. |

Ascarite column weight increased to 11.8 gr. which corresponds to 37 gr. PHBA decomposition or 2.8%.

Example 1 illustrates the preparation of a bisphenol functional polyester with Number Average Molecular Weight=558 and Narrow Molecular Weight Distribution. The reaction was performed with 2 stage addition of PHBA.

EXAMPLE 2

A 3 liter reactor similarly equipped as in Example 1 was charged with:

| | |
|---|---|
| NPG | 676.7 |
| Adipic Acid | 474.6 |
| PHBA | 448.6 |
| BTHO | 0.90 |
| Methane sulfonic acid* | 0.50 |
| $NH_3$ (30% in Water)* | 0.30 |
| Toluene | 100.0 |

*The methane sulfonic acid and ammonia were diluted in 25 gr. deionized water.

The contents were heated to 140° C., then to 160° C., 180° C., 200° C. and 210° C. to distill water formed during the reaction. To maintain the necessary temperature, toluene was transferred between the reactor and an additional funnel to provide the necessary reflux of toluene in the course of the reaction. The reaction was stopped when the carboxylic acid number reached 5.0 mg KOH/gr. The reactor contents were cooled to 100°–110° C. and discharged. The resinous product had a non-volatile matter (NVM) content of 96.4%.

Example 2 illustrates the preparation of polyester of NPG, Adipic Acid and PHBA in molar ratio 2:1:1.

EXAMPLE 3

This example illustrates the preparation of a polyester containing 2-methyl-1,3-propanediol, adipic acid and PHBA in the molar ratio 2:1:1 similar to Example 2.

| | |
|---|---|
| MP-Diol | 585.4 |
| Adipic Acid | 474.6 |
| PHBA | 448.6 |
| BTHO | 0.90 |
| Methane Sulfonic Acid* | 0.50 |
| $NH_3$ (30% in water)* | 0.30 |
| Toluene | 100.0 |

The reaction was conducted in the same way as in Example 2. Final carboxylic acid number=4.2 mg KOH/gr. NVM=96.7%.

Examples 2 and 3 above demonstrate a one stage preparation of low molecular weight and narrow MWD polyesters with mixed functional groups: aliphatic hydroxyls and phenolic hydroxyls are present in a ratio of about 1:1. The ratio represents the average functionality of the polyester molecule. The actual mixture consists of about 25% molar bis aliphatic hydroxyl polyester, about 25% molar bisphenol functional polyester and about 50% molar of polyester with one aliphatic hydroxyl and one phenol group. Both of the polyesters have a low number average molecular weight: Example 2—438 (calculated); Example 3—410 (calculated) and a narrow molecular weight distribution of less than 2.0.

EXAMPLE 4

The following reactants were charged into a 2 liter flask equipped as in Example 1. The molar ratio of 1, 6-hexane diol to adipic acid to PHBA was 2:1:1.

| Material | Amount |
| --- | --- |
| 1,6 Hexane diol | 413.7 |
| Adipic acid | 255.7 |
| PHBA | 241.5 |
| BTHO | 0.51 |
| Methane sulfonic acid* | 0.28 |
| NH$_3$ (30% in water)* | 0.17 |
| Toluene | 75 |

The methane sulfonic acid and NH$_3$ were premixed in 15 g of deionized water. The materials were heated to a maximum temperature of 220° C.; 108 grams of water were collected. The acid number of the product was 3.7 mg KOH/mole. The ratio of phenol and aliphatic hydroxyl in the polyester was about 1:1 and calculated Mn of the product was 466.

EXAMPLE 5

The following reactants were charged into a 3 liter flask equipped as above. The molar ratio of neopentylglycol to sebacic acid to PHBA was 2:1:1.

| Material | Amount |
| --- | --- |
| NPG | 520.0 |
| Sebacic acid | 505.75 |
| PHBA | 345.0 |
| BTHO | 0.77 |
| Methane sulfonic acid | 0.42 |
| NH$_3$ (30% in water) | 0.26 |
| Toluene | 100 |

The methane sulfonic acid and NH$_3$ were premixed in 15 g deionized water. The reactor was heated to a maximum temperature of 220° C.; 144.7 g of water were collected. The acid number of the product was 16.94 mg KOH/gram. The ratio of phenol and aliphatic hydroxyl in the polyester was about 1:1, and calculated $M_n$ was about 494.

EXAMPLE 6

The following materials were charged into a 2 liter flask equipped as above. The molar ratio of methyl propane diol to adipic acid to PHBA was 2:1:1.5.

| Material | Amount |
| --- | --- |
| MP-diol | 360.4 |
| Adipic acid | 292.2 |
| PHBA | 414.0 |
| BTHO | 0.6 |
| Methane sulfonic acid | 0.33 |
| NH$_3$ (30% in water) | 0.20 |
| Toluene | 75.0 |

The methane sulfonic acid and NH$_3$ were premixed in 15 g deionized water. The reactor was heated to a maximum temperature of 200° C. The final acid number of the product was 23.8 mg KOH/gram. NVM=96.0%. The average ratio of phenol to aliphatic hydroxyl in the polyester was about 3:1 and calculated Mn was about 470.

EXAMPLE 7

The following reactants were charged into a 2 liter flask equipped as above. The molar ratio of NPG to adipic acid to PHBA was 2.5:1.5:2.

| Material | Amount |
| --- | --- |
| NPG | 400.4 |
| Adipic acid | 302.4 |
| PHBA | 386.4 |
| BTHO | 0.61 |
| Methane sulfonic acid | 0.34 |
| NH$_3$ (30% in water) | 0.20 |
| Toluene | 75.0 |

The methane sulfonic acid and NH$_3$ were premixed in 15g deionized water. The reactor was heated to a maximum temperature of 207° C. The acid number of the product was 14.7 mg KOH/gram, and 147 g of water were collected. NVM=96.94%; Mn=665.6 (calculated).

EXAMPLE 8

The following materials were charged into a 1 liter flask equipped as above. The molar ratio of NPG to adipic acid to PHBA was 2.1:1:1.5.

| Material | Amount |
| --- | --- |
| NPG | 204.9 |
| Adipic Acid | 136.6 |
| PHBA | 193.9 |
| Methane sulfonic acid | 0.535 |
| Ammonium hydroxide (29.9%) | 0.37 |
| Cyclohexane | 50 |

The methane sulfonic acid and ammonium hydroxide were premixed in log deionized water. The reactor was heated to a maximum temperature of 226° C. The acid number of the product was 15.4 mg KOH/gram and the NVM was 99.69%. The ratio of phenol and aliphatic hydroxyl groups present in the polyester was on average about 3:1 and the calculated $M_n$ was about 498.

EXAMPLE 9

A 2 liter round bottom flask similarly equipped as in Example 1 was charged with:

| Material | Amount |
| --- | --- |
| NPG | 312.45 |
| Adipic Acid | 219.15 |
| PHBA | 414.3 |
| BTHO | 0.53 |
| Methane Sulfonic Acid | 0.295 |
| Ammonia (30% in Water) | 0.18 |
| Toluene | 75.0 |

The methane sulfonic acid and ammonia source were premixed in 15 g deionized water. The contents were heated to 120° C. to start to distill water, then to 160° C., 180° and 200° C. to distill additional water forming during the reaction. To regulate the temperature, toluene was transferred between the reactor and an additional funnel to provide the necessary reflux of toluene in the course of the reaction. The reaction was stopped when carboxylic acid number reached 13 mg. KOH/gr. of solids. The reactor contents were cooled to 100°–110° C. and discharged. The product had NVM=

96.66%. Example 9 demonstrates the preparation of bisphenol functional polyester with low molecular weight and narrow molecular weight distribution similar to Example 1 with NPG, adipic acid and PHBA reacted in molar ratio 2:1:2. The reaction in Example 9 was done in one stage versus 2 stages in Example 1.

EXAMPLE 10

This example shows the use of a cyclic diol, 1,4 cyclohexane dimethanol (CHDM). The following materials were charged into a 3 liter flask equipped as above. The mole ratio of CHDM: Adipic Acid: PHBA was 2:1:1.

| Material | Amount |
|---|---|
| 1,4 CHDM | 662.4 |
| Adipic Acid | 336.0 |
| PHBA | 317.0 |
| BTOH | 0.74 |
| Methane Sulfonic acid | 0.41 |
| $NH_3$ (30% soln) | 0.25 |
| Toluene | 100 |

The methane sulfonic acid and $NH_3$ were premixed in 25 ml of deionized water. The materials were reacted until 147.0 g water were collected. The final acid number was <3.0. The NWM was 95.52%.

In the following examples, curable paint formulations were prepared containing mixtures of some conventional curable base polymers and HMMM crosslinking agent. In some of the examples, a portion of the polymer binder was replaced with 10–30 wt %, based on the weight of binder (base polymer plus crosslinking agent) of a mixture of some of the polyester oligomers prepared in the above examples and HMM. Properties of control formulations (free of added polyester oligomer) and formulations of the invention were evaluated after baking.

Paint formulations having compositions as set forth in the following examples were prepared by first forming a mill base composition and then a let down composition by the general procedure described above.

Test panels were prepared and evaluated as follows:

Thin films of the various formulations were applied to steel test panels via drawdowns. The basic procedures are outlined in ASTM Test Procedure D823-87. Test panels are either untreated Type S cold rolled steel panels obtained from the Q-Panel Company or unpolished Bonderite™ 1000 (iron-phosphate treatment) panels obtained from Advanced Coatings Technology Inc. Panels sizes are either 4"×8" or 3"×6".

Wire-wound drawdown rods and in some cases a Precision Laboratory Drawdown Machine (both from the Paul N. Gardner Company) were used to apply films via hand-pulled drawdowns (Method E). Target dry film thicknesses are 1 mil.

The film property evaluations conducted on all cured panels were as follows:

| Knoop Hardness | ASTM D-1474 |
|---|---|
| Direct Impact | ASTM D-2794 |
| MEK Rubs | ASTM D-3732 |

In the case of impact tests, a ⅝ inch punch with a 0.64 inch die was employed.

EXAMPLES 11–14

(Controls)

Millbases were prepared containing polyester resin Cargill 57-5789 by dispersing the following ingredients using a high speed mixer/disperser:

| | |
|---|---|
| Cargill 57-5789 (85%) | 316.0 |
| MIAK | 32.0 |
| BYK - 300 | 1.65 |
| $TiO_2$ (Kronos ® 2090) | 652.0 |

250.4 grams of the above millbase was mixed with an additional 108.5 grams of Cargill 57-5789 (85.0%), 45.0 grams of HMMM and 75 grams of MIAK to form a curable coating formulation.

50.0 gr. portions of the formulation were combined with BYK-451 catalyst at different levels of PTSA based on binder. The catalyzed compositions were applied by draw down rods to unpolished Bonderite 1000 panels and baked in an oven for 10 min. at 350° F.

Results of the evaluation of coating properties are shown in Table 1.

TABLE 1

| Example | PTSA % per binder | MEK Double Rubs | Knoop Hardness | Dir. Impact |
|---|---|---|---|---|
| 11 | 0.1 | 2 | <1 | 140 |
| 12 | 0.15 | >200 | 1.9 | >160 |
| 13 | 0.2 | >200 | 7.2 | >160 |
| 14 | 0.3 | >200 | 12.7 | >160 |

EXAMPLES 15–18

Control examples 11–14 were repeated except that 20 wt % of a 50/50 mixture of the polyester oligomer prepared in Example 7 and HMMM was included in the formulation as follows:

| | |
|---|---|
| Millbase of Examples 11–14 | 250.4 |
| Cargill 57-5789 (85%) | 67.2 |
| HMMM | 35.1 |
| Product of Example 7 (96.94%) | 21.1 |
| HMMM | 20.5 |
| MIAK | 84.6 |

The oligomer of Example 7 and 20.5 g of HMMM were first premixed prior to addition to the millbase. 50.0 gr. portions of the formulation were catalyzed with BYK-451 at different levels based on binder. The catalyzed compositions were applied by drawdown rods to unpolished Benderite 1000 panels and baked in an oven 10 min. at 350° F.

Results of the evaluation of coating properties are shown in Table II.

TABLE II

| Example | PTSA % per binder | MEK double rubs | Hardness Knoop | Direct Impact |
|---|---|---|---|---|
| 15 | 0.10 | >200 | 1.9 | >100 |
| 16 | 0.15 | >200 | 5.9 | >160 |

TABLE II-continued

| Example | PTSA % per binder | MEK double rubs | Hardness Knoop | Direct Impact |
|---|---|---|---|---|
| 17 | 0.20 | >200 | 9.6 | >160 |
| 18 | 0.30 | >200 | 13.6 | >160 |

As can be seen from a comparison of Tables I and II, inclusion of the oligomer composition of Example 7 into the formulation significantly improves the crosslinking and increases the hardness of the coatings without any adverse effect on flexibility.

EXAMPLES 19–22

(Controls)

These examples were prepared using an alkyd resin Cargill 57-5742. The millbase was prepared as in examples 11–14 and had following composition:

| | |
|---|---|
| Cargill 57-5742 (90.9%) | 300.0 |
| MIAK | 36.0 |
| BYK -300 | 1.60 |
| TiO$_2$ (Kronos ® 2090) | 682.0 |

A coating composition was prepared as follows:

| | |
|---|---|
| The millbase above | 254.9 |
| Cargill 57-5742 (90.0%) | 103.0 |
| HMMM | 53.5 |
| MIAK | 84.5 |

50.0 gr portions of the formulation were catalyzed with BYK-451 at different levels of PTSA per binder.

The catalyzed compositions were applied to unpolished Bonderite 1000 panels and baked 10 min. at 350° F.

Results of the evaluation of baked coating properties are shown in Table III.

TABLE III

| Example | PTSA % per binder | MEK Double Rubs | Hardness Knoop | Dir. Impact |
|---|---|---|---|---|
| 19 | 0.10 | >200 | 2.3 | 120 |
| 20 | 0.15 | >200 | 6.1 | 80 |
| 21 | 0.20 | >200 | 8.6 | 80 |
| 22 | 0.30 | >200 | 11.4 | 40 |

EXAMPLES 23–26

Control examples 19–22 were repeated except that 30 wt % of a 50/50 mixture of the polyester oligomer of Example 2 and HMMM was included in the formulation as follows:

| | |
|---|---|
| Millbase of Ex. 19–22 | 154.6 |
| Cargill 57-5742 (90.0%) | 31.7 |
| HMMM | 20.0 |
| Product of Example 2(96.39%) | 20.1 |
| HMMM | 19.4 |
| MIAK | 51.2 |

The oligomer of Example 2 and 19.4 gr of HMMM were first premixed prior to addition to the millbase. 50.0 gr. portions of the formulations were catalyzed with BYK-451 at different levels per binder. The catalyzed compositions were applied to unpolished Bonderite 1000 as in the examples above and baked 10 minutes at 350° F. Results of the evaluation of properties are presented in Table IV.

TABLE IV

| Example | PTSA % per binder | MEK double rubs | Hardness Knoop | Dir. Impact |
|---|---|---|---|---|
| 23 | 0.10 | >200 | 4.05 | 140 |
| 24 | 0.15 | >200 | | |
| 25 | 0.20 | >200 | 10.13 | 100 |
| 26 | 0.30 | >200 | 12.15 | 80 |

As can be seen from a comparison of Tables III and IV, substitution of 30% binder in control formulation by a 50:50 mixture of low molecular weight and narrow molecular weight distribution phenol aliphatic hydroxyl (1:1) polyester and amino-curing resin caused essential improvement in crosslinking and provided better hardness and simultaneously better flexibility. This combined improvement is very important because normally one can improve hardness but at the price of flexibility. This means that appropriate comparison of flexibilities (impact resistance) should be done at the same hardness.

Data presented in FIG. 1 are based on Table III and IV comparisons and demonstrate correlation between impact and hardness for control formulations (box points) and formulation with 20% binder substituted with 50:50 mixture of the phenol-aliphatic hydroxyl functional polyester of Example 2 and HMMM crosslinking agent (triangle points). As seen from FIG. 1, at equal hardnesses the flexibility of the modified compositions significantly exceeds the flexibility of the control non-modified compositions.

EXAMPLES 27–29

| | |
|---|---|
| Millbase (Ex. 19–22) | 154.6 |
| Cargill 57-5742 (90.0%) | 31.7 |
| HMMM | 22.6 |
| Resin of Example 3 (96.69%) | 16.05 |
| HMMM | 23.3 |
| MIAK | 51.7 |

The oligomer and 23.3 gr of HMMM were first premixed as above. 50.0 gr. portions of the formulations were catalyzed with BYK-451 at different levels per binder. The catalyzed compositions were applied to unpolished Bonderite 1000 panels and baked 10 min. at 350° F.

Results of the evaluation of coating properties are presented in Table V.

TABLE V

| Example | PTSA % per binder | MEK double rubs | Hardness Knoop | Direct Impact |
|---|---|---|---|---|
| 27 | 0.10 | >200 | 2.7 | 140 |
| 28 | 0.20 | >200 | 7.3 | 100 |
| 29 | 0.30 | >200 | 10.2 | 80 |

This example demonstrates the use of phenol-aliphatic hydroxyl functional low molecular weight narrow molecular weight distribution polyester in mixture with HMMM at ratio 40:60 as a binder substitute in the control composition (30% of binder). As seen from a comparison of Tables V and III. this ratio also provides significant improvement in flexibility at different hardnesses versus the control composition.

EXAMPLES 30–33

| Millbase of Ex. 19–22 | 154.6 |
|---|---|
| Cargill 57-5742 (90.0%) | 38.6 |
| HMMM | 26.0 |
| Resin of Example 6 (95.97%) | 13.6 |
| HMMM | 13.1 |
| MIAK | 54.1 |

The oligomers of Example 6 and 13.1 gr of HMMM were first premixed as above. 50.0 gr. portions of the formulations were catalyzed with BYK-451 at different levels PTSA per binder. The catalyzed compositions were applied to unpolished Bonderite 1000 panels and baked 10 minutes at 350° F.

Results of the evaluation of coating properties are presented in Table VI.

TABLE VI

| Example | PTSA % per binder | MEK double rubs | Hardness Knoop | Direct Impact |
|---|---|---|---|---|
| 30 | 0.10 | >200 | 6.6 | 100 |
| 31 | 0.15 | >200 | 10.6 | 80 |
| 32 | 0.20 | >200 | 12.9 | 80 |
| 33 | 0.30 | >200 | 16.3 | 60 |

Examples 30–33 demonstrate the effect of 20% binder substitution by 50:50 mixture of phenol-aliphatic hydroxyl functional polyester (3:1 molar ratio of phenol and hydroxyl functionality) and HMMM.

Comparison of the Table VI data with Table III–V data demonstrates that higher levels of phenol functionality generate a better increase in hardness even at a lower level of binder substitution, and increased flexibility at essentially higher hardnesses.

Figure 2:
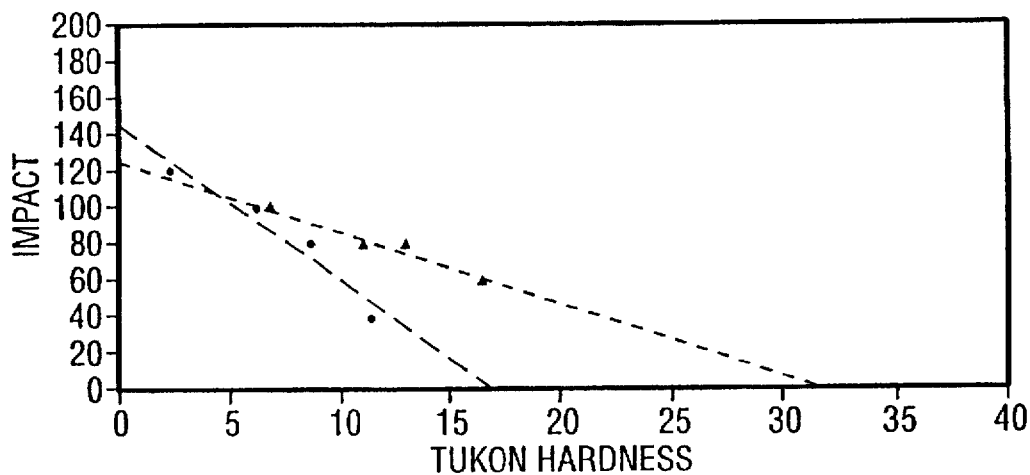

FIG. 2 shows the correlation between hardness and flexibilities for these compositions (triangle points) in comparison with control compositions (box points). As seen from the data, the modified compositions allow significantly expanded range of hardnesses achievable along with significantly improved flexibility.

EXAMPLES 34–37

| Millbase of Examples 19–22 | 154.6 |
|---|---|
| Cargill 57-5742 (90.0%) | 38.6 |
| HMMM | 26.0 |
| Resin of Example 7 (96.94%) | 13.5 |
| HMMM | 13.1 |
| MIAK | 54.2 |

The oligomer of Example 7 and 13.1 gr HMMM were first premixed as above. 50.0 gr. portions of the formulations were catalyzed with BYK-451 and applied to panels and baked as in Examples 30–33. Results of the evaluation of coating properties are shown in Table VII.

TABLE VII

| Example | PTSA % per binder | MEK double rubs | Hardness Knoop | Direct Impact |
|---|---|---|---|---|
| 34 | 0.10 | >200 | 6.5 | 100 |
| 35 | 0.15 | >200 | 10.9 | 80 |
| 36 | 0.20 | >200 | 16.6 | 60 |
| 37 | 0.30 | >200 | 25.1 | 40 |

Examples 34–37 demonstrate the effect of 20% binder substitution by a 50:50 mixture of low molecular weight narrow molecular weight distribution of mostly bisphenol functional polyester of Example 7 and HMMM. The data of Table VII demonstrates high hardness coatings showing still significant flexibility.

Figure 3:
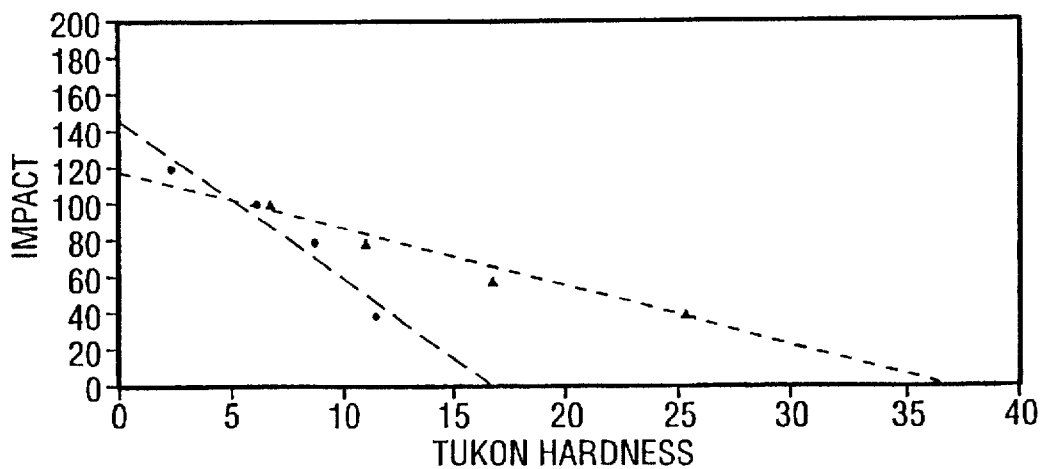

FIG. 3 presents correlation between hardness and flexibilities for these compositions (triange points) in comparison with control compositions (box points).

The data demonstrates the importance of the level of phenol functionality present in the polyester oligomer with respect to the ultimate physical properties of formulations containing the polyester oligomers as modifying additives to conventional curable polymer formulations. Also, such significant improvements are achieved without increasing the VOC of the coating formulations, and in many cases with even a reduction in VOC.

What is claimed is:

1. A crosslinkable polyester oligomer composition comprising one or a mixture of polyester oligomers (a) and (b):

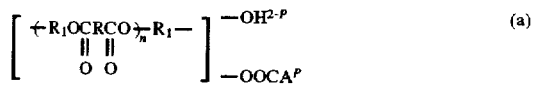

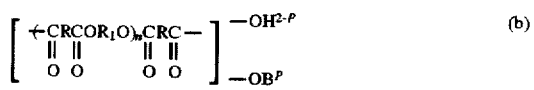

wherein R is the residue of at least one aliphatic, cycloaliphatic or mixed aliphatic/aromatic polycarboxylic acid having from 2 to about 20 carbons atoms, $R_1$ is the residue of at least one aliphatic, cycloaliphatic or mixed aliphatic/cycloaliphatic polyol having from 2 to about 20 carbon atoms. A is a radical of the formula:

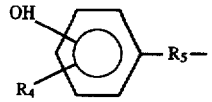

B is a radical of the formula:

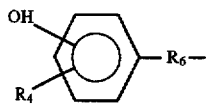

wherein $R_4$ is H, OH, halogen or an organic radical containing 1 to 4 carbon atoms, $R_5$ is a direct bond or an organic radical containing 1 to 20 carbon atoms and $R_6$ is an organic radical containing 2 to 20 carbon atoms, n is a number averaging from greater than 0 up to less than 2 and P is a number averaging from about 0.5 up to less then 2, said polyester oligomer further characterized by a number average molecular weight in the range of from about 250 to about 1.000 and a polydispersity of less than about 2.0.

2. The composition of claim 1 wherein A is the residue of para-hydroxy benzoic acid.

3. The composition of claim 1 wherein said oligomer is (a) and p averages about 0.5 to 1.9.

4. The composition of claim 3 wherein p averages from about 0.8 to 1.9.

5. The composition of claim 3 wherein p averages from about 1 to 1.7.

6. The composition of claim 1 wherein n averages from about 0.5 to about 1.5.

7. The composition of claim 1 wherein n averages from about 0.5 to 1.3.

8. The composition of claim 1 wherein said oligomer has a polydispersity of less than about 1.7.

9. The composition of claim 8 wherein said oligomer has a polydispersity of less than about 1.5.

10. The composition of claim 1 wherein said oligomer has a number average molecular weight of up to about 800 and a polydispersity of less than about 1.7.

11. The composition of claim 1 wherein R and $R_1$ are aliphatic and contain from 2 about 10 carbon atoms.

12. The composition of claim 1 further containing crosslinking agent for said composition.

13. The composition of claim 12 wherein said crosslinking agent is a methylol (alkoxymethyl) amino crosslinking agent present in said composition in an amount effective to crosslink the composition.

14. The composition of claim 13 wherein said crosslinking agent and said polyester oligomer are blended in a 70:30 to 30:70 weight ratio.

* * * * *